(12) United States Patent
Tores et al.

(10) Patent No.: US 6,220,524 B1
(45) Date of Patent: Apr. 24, 2001

(54) DEVICE FOR HEATING A SPRAY NOZZLE

(75) Inventors: Denis Tores, Vaux le Pénil (FR); Péter Sulyok, Budapest (HU)

(73) Assignee: Inderflex, Le Chalet en Brie (FR)

( * ) Notice: Subject to any disclaimer, the term of this patent is extended or adjusted under 35 U.S.C. 154(b) by 0 days.

(21) Appl. No.: 09/230,303

(22) PCT Filed: May 22, 1998

(86) PCT No.: PCT/FR98/01032

§ 371 Date: Nov. 8, 1999

§ 102(e) Date: Nov. 8, 1999

(87) PCT Pub. No.: WO98/52695

PCT Pub. Date: Nov. 26, 1998

(30) Foreign Application Priority Data

May 23, 1997 (FR) .................................................. 97 06348

(51) Int. Cl.[7] ...................................................... B05B 1/24
(52) U.S. Cl. ........................ 239/130; 239/135; 239/284.1
(58) Field of Search ............................... 239/13, 128, 135, 239/284.1, 284.2, 130, 131, 132, 133, 134; 15/250.05; 392/479, 480, 473, 474, 475; 219/505

(56) References Cited

U.S. PATENT DOCUMENTS

| 3,060,298 | * | 10/1962 | Swanson | 392/474 |
| 4,088,269 | | 5/1978 | Schlick | 239/133 |
| 5,163,619 | * | 11/1992 | Wada | 239/284.1 |
| 5,979,796 | * | 11/1999 | Ponziani et al. | 239/284.1 |

FOREIGN PATENT DOCUMENTS

| 25 19 902 A1 | 11/1976 | (DE) | B60S/1/46 |
| 37 17 574 A1 | 12/1988 | (DE) | H05B/3/10 |
| 2 283 801 | 4/1976 | (FR) | B60S/1/48 |
| 2 193 617 | 2/1988 | (GB) | H05B/3/74 |
| 2 274 410 | 7/1994 | (GB) | B05B/1/24 |
| 2-267881 | 11/1990 | (JP) | H05B/3/20 |

* cited by examiner

Primary Examiner—Lisa Ann Douglas
(74) Attorney, Agent, or Firm—Nawrocki, Rooney & Sivertson, P.A.

(57) ABSTRACT

A heating device for a vehicle's spray nozzle, designed to eject a washing liquid onto an external surface via at least one protruding orifice, with the heating device placed in the surrounding of the spray nozzle. The device has a first variable rating resistor and a second fixed rating resistor which are connected in parallel to a voltage supply. Both resistors are mounted on a support, and arranged such that the second resistor stabilizes the heating temperature of the device.

18 Claims, 1 Drawing Sheet

DEVICE FOR HEATING A SPRAY NOZZLE

TECHNICAL FIELD

The present invention relates to a heating device for a vehicle's spray nozzle arranged to eject a heated washing liquid onto an external window surface through an orifice.

BACKGROUND OF THE INVENTION

In current spray nozzles for automobiles at least a portion of the orifice protrudes and is permanently located outside of the vehicle proper where the nozzle is directly exposed to bad weather. Under those conditions the nozzle, or at least the protrusion, may freeze up.

A heating device is thus necessary to rapidly de-ice the spray nozzle and to enable it to operate again with the washing liquid circulating freely. In the automotive industry, two methods are known to accomplish this.

In a first method, the liquid inside the supply duct to the orifice is heated to a temperature vastly above 0° C., for instance between 50 and 60° C. Here the heating system consists of a disk-shaped heating device, comprising a variable positive temperature resistor. This type of heating system is made of metal and a ceramic-based compound material. However, there are a number of shortcomings with this method. Since the heating device is located inside the supply duct the connections are complex, costly and not particularly amenable to welding. Further, the dimensions and the shape of the heating device are not efficient from a thermotechnical viewpoint, the more so because when it must be cooled down since high voltages are required.

In a second method, the portion surrounding the protruding orifice of the spray nozzle is heated to a temperature above 0° C. Here the heating device consists of a resistor, whose rating varies according to temperature, and a resistor, whose rating is fixed. The resistors are connected in series. This method also has a number of shortcomings. First, a large surface resistor is necessary to provide efficient heating because of the high thermal load, and because of the series connection, high voltage is required.

The above heating devices are relatively costly, complex to manufacture, and also difficult to miniaturize, such that they cannot be located sufficiently close to the protruding orifice for optimum performance.

SUMMARY OF THE INVENTION

This invention improves the efficiency of the heating system of the spray nozzle by locating the heating element in the proximity of the protruding orifice, and by using a simple and cheap heating device. This is made possible by miniaturizing the heating device to permit installing it as close as possible to the protruding orifice. The invention also improves the method of regulating the temperature generated by the heating device. An important requirement is that, when energized, the heating output must be as high as possible, and that heat must be produced as quickly as possible.

To accomplish these results, the invention provides a heating device which has a first, positive temperature coefficient type (PTC), resistor and a second, fixed rating, resistor, with the first and second resistors mounted on a support and connected in parallel to a voltage supply source. The function of the second resistor is to stabilize the temperature of the heating device. The rating of the first resistor varies in relation to the ambient temperature. More precisely, the rating of the first resistor increases or decreases, when the ambient temperature or its own temperature correspondingly increases or decreases. This results because of the first resistor being a positive temperature coefficient resistor. Both the first and second resistors are electronic components.

The invention also provides a vehicle's spray nozzle, which is designed to eject a liquid onto an external washing surface via at least one protruding orifice, and which is connected to at least one liquid supply duct. The spray nozzle comprises an external sheath through which the supply duct extends with the orifice protruding from a surface. The spray nozzle utilizes the heating device described above. The heating device is located in the immediate vicinity of the protruding orifice. More precisely, the heating device is located inside the spray nozzle, positioned upstream from and close to the protruding orifice.

DETAILED DESCRIPTION OF THE INVENTION

Figure 4:
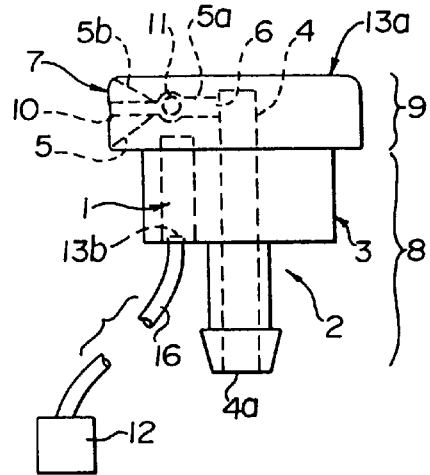
FIG. 4 is a lateral view of the spray nozzle.
Figure 5:
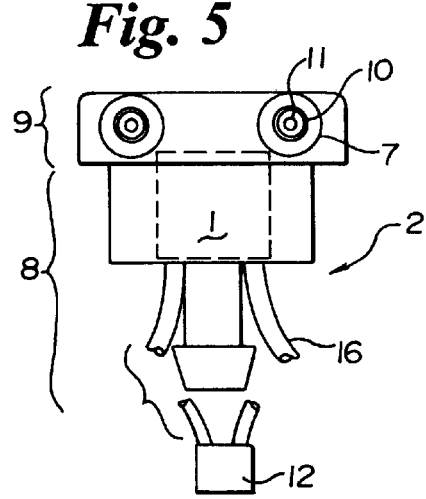
FIG. 5 is a schematic front view of the spray nozzle.

Referring now to the drawings wherein like reference numerals denote like elements throughout the several views. FIGS. 4 and 5 show a heating device 1 of a spray nozzle 2 for ejecting a washing liquid onto an external surface, for example, a glazed surface.

In the preferred embodiment, spray nozzle 2 is used to distribute of liquid to clean either a windshield, a rear window or the cover glass of a vehicle's headlamp. Spray nozzle 2 generally deposits a windshield cleaning liquid on the glazed surfaces mentioned above in predetermined zones.

Spray nozzle 2 could also be located in various other locations. For examples: on the front bonnet, under the front bonnet, or, in the case of a windshield, on the wiper itself. For a rear window, spray nozzle 2 can be located under the roof of the vehicle or on the rear door. As an alternative, spray nozzle 2 can be located on the arm of the windshield wiper. To clean a headlamp, spray nozzle 2 can be located on the front shield of the vehicle, on the calender or on the headlamp itself.

Spray nozzle 2 comprises an outer sheath 3, which can be made of thermoplastic plastic material. Within outer sheath 3, spray nozzle 2 comprises a supply duct 4 and at least one outlet duct 5.

Outlet duct 5 leads in one direction to the supply duct 4 via a communication hole 6, and in the opposite direction to the external surface of the sheath 3, via protruding orifice 7. In the preferred embodiment, the outlet duct 5 extends essentially perpendicular to supply duct 4. Obviously a number of outlet ducts 5 can be provided as well as a different tilting degree of outlet duct(s) 5 in relation to the supply duct 4. Here supply duct 4 and the outlet duct 5 are oriented more or less rectilinearly.

Liquid is fed through the supply duct 4 via its free end 4a, which is opposite the communication hole 6. The liquid then flows into the outlet duct 5 where it is expelled through protruding orifice 7. Spray nozzle 2 is essentially in the shape of a mushroom, with a body 8 and a head 9. Body 8 comprises supply duct 4, and head 9 comprises outlet duct 5 and protruding orifice 7. In this embodiment, body 8 of spray nozzle 2 extends essentially perpendicular to head 9, although obviously, they could be tilted with respect to one another.

The supply duct has an inner section with a cross-section which is essentially circular. Outlet duct 5 has a section which is truncated towards orifice 7. Outlet duct 5 has a first section 5a which is essentially circular and leads to communication hole 6.

Outlet duct 5 has a second section 5b which adjoins a first section 5a, which leads to orifice 7. In section 5b, pipe 10 extends from its junction with section 5a up to orifice 7, which enables liquid to pass. Pipe 10 has an essentially uniform section which is essentially circular with a smaller diameter than section 5a and communication hole 6. As a variation, outlet duct 5 can contain only one truncated section 5b. In that event, pipe 10 would extend from communication hole 6. Pipe 10 ends essentially at the level of orifice 7.

Pipe 10 has a ball 11 which is free to rotate which permits it to change orientation. Ball 10 is at the extreme end of pipe 10 adjacent to section 5a. The truncated shape of section 5b allows an angular adjustment of ball 11.

In this embodiment, ball 11 is made of metal, and, if desired, the surface delineating orifice 7 can also be made of metal. Under certain climatic conditions, the edges of orifice 7 as well as ball 11 can freeze. In order to de-ice these components, spray nozzle 2 comprises a heating device 1, arranged inside sheath 3.

Figure 1:
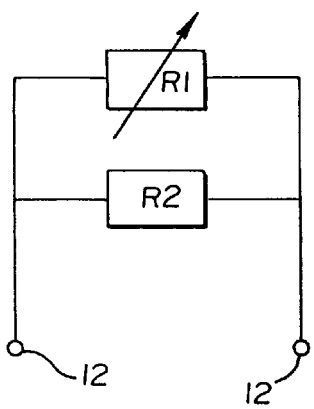
FIG. 1 is a wiring diagram of the heating device.
Figure 2:
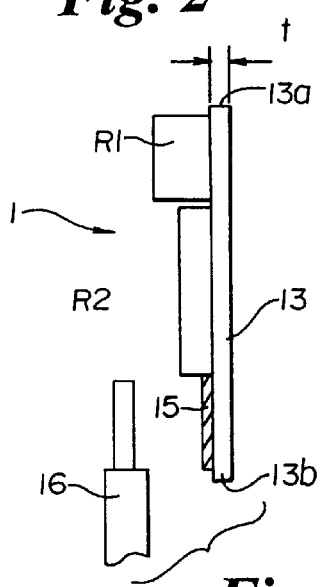
FIG. 2 is a schematic lateral view of the heating device.
Figure 3:
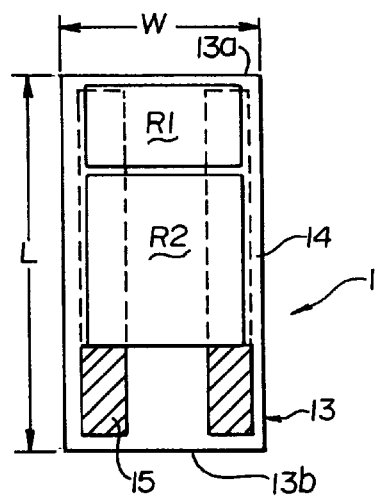
FIG. 3 is a schematic plane view of the heating device.

FIGS. 1 to 3 show heating device 1, which comprises a first variable resistor R1 and a second fixed resistor R2. As shown in FIG. 1, resistors R1 and R2 are connected in parallel with each other, and this parallel combination is connected to voltage supply 12. Resistors R1 and R2 are provided as electric components to miniaturize heating device 1. Both R1 and R2 are installed on a ceramic plate 13. The thickness t of plate 13 is approximately 0.5 mm., its width w is approximately 6 mm. and its length L is approximately 8 mm.

Resistors R1 and R2 are connected together electrically by conduction surface 14 which extends along the length L of plate 13. Conduction surface 14 has been developed using thick film technology, and the resistors are attached here with four welding points.

Variable resistor R1 is a positive temperature coefficient type (PTC). A PTC type resistor is characterized in that its rating increases or decreases, when the room temperature or its own temperature, respectively increases or decreases.

With a direct supply voltage of between 12 and 14 volts, the rating of the resistor R1 ranges from 30 ohms to 1 kilo-ohm. In the preferred embodiment, resistor R1 is ceramic-based. Resistor R2 has also been developed using thick film technology. The function of resistor R2 is to stabilize the thermal energy released by resistor R1. This function is provided by the parallel connection the resistors R1 and R2, and by resistors R1 and R2 having the same support 13. As shown, first resistor R1 is located towards extreme edge 13a of plate 13, while second resistor R2 is located essentially at the center of plate 13. Resistor R1 is consequently located higher than the resistor R2, as shown on FIG. 1. Resistor R2 is also in contact, via the conduction surface 14, with connection surface 15, which is designed to accommodate cables 16 from a voltage supply source 12. Connection surface 15 is thus located more or less at extreme edge 13b of plate 13, opposite edge 13a.

Conductive cables 16 are connected to a power supply source 12 to provide a voltage supply means. Each cable 16 is fastened to support 13 on connection surface 15, using a rigid attachment means which also ensures thermal conductibility, which includes such processes as gluing and welding.

Heating device 1 is located inside spray nozzle 2 in the immediate proximity of orifice 7. As shown in FIG. 4, plate 13 extends essentially parallel to supply duct 4, arranged such that at least that portion of plate 13 which includes resistor R1, is located in head 9 of spray nozzle 2. Plate 13 is also arranged such that edge 13a, which comprises first resistor R1, is located opposite and as close to ball 11 as possible. Edge 13a is therefore located upstream and close to orifice 7. According to the preferred embodiment, edge 13a is approximately 0.5 mm. away from ball 11.

Spray nozzle 2 includes an interior space arranged to accommodate heating device 1, which space extends essentially parallel to supply duct 4. Heating device 1 is fixed rigidly to the walls of this space via fastening means, which are arranged to ensure thermal conductibility, being essentially identical to thermoplastic material. This fastening process also includes such processes as gluing and welding. Heating device 1 is secured within the space within spray nozzle 2, and cables 16 are secured to device 1 by the fastening process.

The thermal capacity of the metal balls 11 are significantly higher than that of thermoplastic sheath 3. This requires first resistor R1 to be located upstream from and in the immediate vicinity of ball 11. This is important because head 9 of spray nozzle 2 is usually located outside the body of the vehicle. Plate 13 could be arranged to be tilted with respect to supply duct 4, without changing the results of using heating device 1.

The above description shows how thermal balance can be established in spray nozzle 2 and its external thermal ducts, and also, how the quantity of heat generated by first resistor R1 and released to spray nozzle 2 is balanced.

Two examples of the invention follow. In both examples spray nozzle 2 weighs essentially between 5 and 10 grams, and the constant rating of the resistor R2 ranges between 160 and 180 ohms.

In the first example, the external temperature is approximately −30° C. Here the heating current increases as long as the quantity of heat generated is lower than the total quantity of heat released and absorbed by the spray nozzle 2. Under these conditions, since the heating device 1 generates no heat, the rating of the first resistor R1 remains minimal, i.e. around 30 ohms. Second resistor R2, which is parallel to the first resistor R1, thus stabilizes the oscillating effect of temperature.

In the second example, the external temperature is equal to or greater than −5° C. The quantity of heat generated is greater than the total quantity of heat released and absorbed by the spray nozzle 2. Heat therefore builds up inside the spray nozzle 2. As a consequence, the room temperature of first resistor R1 increases considerably and its rating will then be greater than 30 ohms. Under these conditions, the heating device 1 absorbs a smaller current and the current decreases until thermal balance is established. This situation is maintained automatically, since the heat generated on the first resistor R1 can ensure continuous production of the necessary heat quantity to keep the high temperature of the resistor R1.

The scope of the invention is as defined in the language of the claims.

What is claimed is:

1. A heating device for a vehicle's spray nozzle designed for ejecting a washing liquid onto an external surface via at least one protruding orifice, whereas the said heating device should be placed in the surrounding area of the spray nozzle, characterized in that it comprises a first variable rating resistor and a second fixed rating resistor whereby the first and the second resistors are mounted in parallel on a support and connected to voltage supply means; whereas the second resistor stabilizes the heating temperature of the device.

2. A heating device according to claim 1, characterized in that the rating of the first resistor varies in relation to the ambient temperature.

3. A heating device according to claim 2, characterized in that the first resistor resistance increases, when the ambient temperature or its own temperature increases, and decreases when either decrease.

4. A heating device according to claim 3, characterized in that the first resistor is a positive temperature coefficient resistor whose rating varies more or less between 30 ohms and 1 kilo-ohm.

5. A heating device according to claim 4, whereas the first and second resistors are electronic components.

6. A heating device according to claim 5, characterized in that the first resistor is ceramic-based.

7. A heating device according to claim 6, characterized in that the support is a ceramic plate.

8. A heating device according to claim 7, characterized in that the device is supplied with a voltage ranging more or less between 12 and 15 volts.

9. A heating device according to claim 8, characterized in that the voltage supply means comprise at least one conductive cable.

10. A heating device according to claim 7, characterized in that the device is supplied with a voltage ranging more or less between 12 and 15 volts; further characterized in that the voltage supply means comprise at least one conductive cable; further characterised in that any such cable is fixed to the support of the resistors via rigid attachment means ensuring thermal conductibility, represented by such processes as gluing and welding.

11. A vehicle's spray nozzle designed for ejecting a liquid onto an external washing surface via at least one protruding orifice connected to at least one liquid supply duct; whereas the spray nozzle comprises an external sheath inside which extends the supply duct and at the surface of which protrudes the orifice, characterized in that it comprises a heating device according to claim 10.

12. A spray nozzle according to claim 11, characterized in that the heating device is placed in the immediate proximity of the protruding orifice.

13. A spray nozzle according to claim 12, characterized in that the heating device is placed inside the spray nozzle, upstream from and close to the protruding orifice.

14. A spray nozzle according to claim 13, characterized in that the heating device extends more or less parallel to the washing liquid supply duct.

15. A spray nozzle according to claim 14, characterized in that it comprises besides, at the level of the protruding orifice, at least one ball free to rotate.

16. A spray nozzle according to claim 15, characterized in that the surface delineating the protruding orifice and, the ball are made of metal.

17. A spray nozzle according to claim 16, characterized in that its external sheath is made of plastic material, thermoplastic material.

18. A spray nozzle according to claim 17, characterized in that the heating device is fixed inside the spray nozzle by rigid attachment means, ensuring thermal conductibility, represented by such processes as gluing and welding.

* * * * *